US008871922B2

(12) United States Patent
Hu et al.

(10) Patent No.: US 8,871,922 B2
(45) Date of Patent: Oct. 28, 2014

(54) CELLULOSE MATERIALS WITH NOVEL PROPERTIES

(75) Inventors: Thomas Q. Hu, Vancouver (CA); Ali Hayek, Burnaby (CA)

(73) Assignee: FPInnovations, Pointe-Claire, Quebec (CA)

( * ) Notice: Subject to any disclaimer, the term of this patent is extended or adjusted under 35 U.S.C. 154(b) by 139 days.

(21) Appl. No.: 13/256,973

(22) PCT Filed: Mar. 17, 2010

(86) PCT No.: PCT/CA2010/000397
§ 371 (c)(1),
(2), (4) Date: Oct. 21, 2011

(87) PCT Pub. No.: WO2010/105357
PCT Pub. Date: Sep. 23, 2010

(65) Prior Publication Data
US 2012/0041183 A1 Feb. 16, 2012

Related U.S. Application Data

(60) Provisional application No. 61/202,631, filed on Mar. 20, 2009.

(51) Int. Cl.
C08B 15/06 (2006.01)
C08F 251/00 (2006.01)
C08H 8/00 (2010.01)
D21H 11/20 (2006.01)
D21H 17/07 (2006.01)
D21H 21/40 (2006.01)

(52) U.S. Cl.
CPC ........ *C08B 15/06* (2013.01); *C08H 8/00* (2013.01); *D21H 11/20* (2013.01); *D21H 17/07* (2013.01); *D21H 21/40* (2013.01)
USPC .............................................. 536/30; 527/312

(58) Field of Classification Search
USPC .............................................. 527/312; 536/30
See application file for complete search history.

(56) References Cited

U.S. PATENT DOCUMENTS

| 4,005,026 | A | * | 1/1977 | Heath et al. ............... 510/394 |
| 4,124,758 | A | * | 11/1978 | Watts et al. ............... 536/43 |
| 4,531,000 | A | * | 7/1985 | Yalpani ...................... 536/30 |
| 4,683,298 | A | * | 7/1987 | Yalpani ...................... 536/45 |
| 4,959,461 | A | * | 9/1990 | Yalpani et al. ........... 536/18.7 |
| 4,963,664 | A | * | 10/1990 | Yalpani et al. ........... 536/18.7 |
| 4,988,806 | A | * | 1/1991 | Gruning et al. .............. 536/98 |
| 5,463,034 | A | * | 10/1995 | Buysch et al. ........... 536/17.2 |
| 5,684,141 | A | * | 11/1997 | Schrell et al. ........... 536/18.7 |
| 5,760,200 | A | * | 6/1998 | Miller et al. ............... 536/21 |
| 5,938,995 | A | * | 8/1999 | Koltisko et al. ........... 264/128 |
| 6,075,166 | A | * | 6/2000 | Garigipati et al. ........... 564/89 |
| 6,103,885 | A | * | 8/2000 | Batelaan et al. ......... 536/18.7 |
| 6,548,659 | B1 | * | 4/2003 | Breitenbeck et al. ........ 536/30 |
| 6,562,626 | B1 | * | 5/2003 | Murray ...................... 436/94 |
| 6,610,669 | B1 | * | 8/2003 | Calias et al. ............... 514/57 |
| 6,673,206 | B1 | * | 1/2004 | Linhart et al. ........... 162/164.3 |
| 6,772,708 | B2 | * | 8/2004 | Klofta et al. ............... 116/206 |
| 6,893,473 | B2 | * | 5/2005 | Neogi et al. ............. 8/115.52 |
| 6,969,445 | B1 | | 11/2005 | Hibino |
| 7,384,504 | B2 | * | 6/2008 | Hu et al. ................... 162/76 |
| 7,678,187 | B2 | * | 3/2010 | Boersma et al. ......... 106/217.6 |
| 7,816,516 | B2 | * | 10/2010 | Sommermeyer et al. ..... 536/124 |
| 8,007,635 | B2 | * | 8/2011 | Tan et al. ................... 162/70 |
| 8,012,907 | B2 | * | 9/2011 | Berrada ...................... 502/402 |
| 8,287,850 | B2 | * | 10/2012 | Eichner et al. ........... 424/85.1 |
| 2002/0056534 | A1 | * | 5/2002 | Thomas ...................... 162/72 |
| 2002/0156498 | A1 | * | 10/2002 | Jo et al. ...................... 606/213 |
| 2003/0051295 | A1 | * | 3/2003 | Soane et al. .............. 8/115.51 |
| 2004/0123962 | A1 | | 7/2004 | Shannon et al. |
| 2004/0173328 | A1 | * | 9/2004 | Hu et al. ................... 162/70 |
| 2004/0219217 | A1 | * | 11/2004 | Volpato et al. ............. 424/488 |
| 2005/0260188 | A1 | * | 11/2005 | Liu et al. ................. 424/94.64 |
| 2005/0269049 | A1 | * | 12/2005 | Hu et al. ................... 162/72 |
| 2006/0036004 | A1 | * | 2/2006 | Wu et al. ................... 524/13 |
| 2006/0260773 | A1 | * | 11/2006 | Tan et al. ................... 162/70 |
| 2007/0006774 | A1 | * | 1/2007 | Rogers et al. ........... 106/200.2 |
| 2007/0134197 | A1 | * | 6/2007 | Eichner et al. ........... 424/85.1 |

(Continued)

FOREIGN PATENT DOCUMENTS

| JP | H02293500 | 12/1990 |
| JP | H11510701 | 9/1999 |

(Continued)

OTHER PUBLICATIONS

Lasseuguette, Celllulose, 2008, 15, 571-580.*
Allan et al., "Fiber Surface Modification. Part I The Reactivity of Lignocellulosic Fibers with a Dichloro-s-Triazine", Paperi ja Puu 50(9): 529-534 (1968).
Dong and Roman, "Fluorescently labeled cellulose nanocrystals for bioimaging applications", J. Am. Chem. Soc. 129: 13810-13811 (2007).
Lonngren and Goldstein, "Coupling of Aldobionic Acids to Proteins Using Water-soluble Carbodiimide" in: Methods in Enzymology, Academic Press, Inc. vol. 242, pp. 116-123 (1994).
Nakajima and Ikada, "Mechanism of Amide Formation by Carbodiimide for Bioconjugation in Aqueous Media", Bioconjugate Chem. 6: 123-130 (1995).

(Continued)

*Primary Examiner* — Liam J Heincer
(74) *Attorney, Agent, or Firm* — Norton Rose Fulbright Canada LLP

(57) ABSTRACT

A molecule possessing a primary or secondary amino group and an additional functionality capable of providing a novel or improved property to a cellulose material has been permanently attached to the cellulose material in aqueous media using a water-soluble carbodiimide as the coupling agent/activator. One such molecule is 5-aminofluorescein (abbreviated as "A-fluo") and one such cellulose material is a papermaking pulp. Papers made from a pulp furnish containing, for example, 0.01 wt. % of the "A-fluo"-attached pulp show an embedded marker feature authenticable upon UV or visible light excitation. The "A-fluo"-attached pulp can also be used for the marking and identification of a pulp furnish.

17 Claims, No Drawings

(56) References Cited

U.S. PATENT DOCUMENTS

| | | | |
|---|---|---|---|
| 2007/0148128 A1* | 6/2007 | Kennedy et al. | 424/78.31 |
| 2007/0270608 A1* | 11/2007 | Boersma et al. | 562/400 |
| 2008/0204538 A1 | 8/2008 | Kovacs et al. | |
| 2009/0035356 A1* | 2/2009 | Bui-Khac et al. | 424/445 |
| 2009/0114355 A1* | 5/2009 | Potrawa et al. | 162/140 |
| 2010/0076118 A1* | 3/2010 | Yano et al. | 523/351 |
| 2010/0206503 A1* | 8/2010 | Yabe et al. | 162/158 |
| 2011/0059441 A1* | 3/2011 | Pelton et al. | 435/6 |

FOREIGN PATENT DOCUMENTS

| | | |
|---|---|---|
| JP | 2003508642 | 3/2003 |
| JP | 2004360088 | 12/2004 |
| JP | 2007321072 | 12/2007 |
| WO | 9707203 | 2/1997 |
| WO | 2008124489 | 10/2008 |
| WO | 2009078492 | 6/2009 |

OTHER PUBLICATIONS

Sehgal and Vijay, "A Method for the High Efficiency of Water-soluble Carbodiimide-mediated Amidation", Anal. Biochem. 218: 87-91 (1994).

Nozaki, "Efficient Amounts of Additives for Peptide Coupling Mediated by a Water-soluble Carbodiimide in Aqueous Media", Chem. Lett.1-2 (1997).

Kitaoka et al., "Sizing Mechanism of Emulsion Rosin Size-Alum Systems Part 1. Relationships between Sizing Degrees and Rosin Size or Aluminium Content in Rosin-sized Handsheets", Nordic Pulp Paper Res. J. 4: 253-260 (1995).

Saari and Seitz, "pH Sensor based on immobilized fluoresceinamine (isomer I)", Anal. Chem. 54: 821-823 (1982).

Ham et al., "Application of optical fiber pH sensor: sensors based on chemical bond of the dye with the surface of materials", Polymer Preprints 45(1): 978-979 (2004).

Kang et al., "Applications of pH sensor using a covalent bond indicator based on containing functional group copolymer", Mol. Cryst. Liq. Cryst. 445: 285/[575]-290/[580], (2006).

Kurtz, "Use of copper (II) ion in masking $\alpha$-amino groups of amino acids", J. Biol. Chem. 180(3): 1253-1267 (1949).

Katz et al., "The determination of strong and weak acidic groups in sulfite pulps", Svensk Papperstidn. 87(6): R48-R53 (1984).

Horvath and Lindstrom, "Indirect polyelectrolyte titration of cellulosic fibers—surface and bulk charges of cellulosic fibers", Nordic Pulp Paper Res. J. 22(1): 87-92 (2007).

Winter et al., "Polyelectrolytes adsorbed on the surface of cellulosic materials", J. Colloid Interface Sci. 111(2): 537-543 (1986).

Terayama, "Method of colloid titration (a new titration between polymer ions", J. Polym. Sci. 8(2): 243-253 (1952).

Ahsmann et al., "Amino acid cellulose films as models for histochemical protein reactions", Histochemie, 1968, 12(1), 285-288.

Kobayashi et al., "Use of water-soluble carboiimide (EDC) for immobilization of EDC-sensitive dextranase", Agricultural Biology and Chemistry, 1989, 53(8), 2211-2216.

Pan, George X., Pulp Yield loss in alkaline peroxide bleaching of aspen CTMP Part 1: Estimation and impacts, Tappi Journal, vol. 2 No. 9, Sep. 2003, pp. 27 to 32.

Supplementary European Search Report issued May 3, 2003—EP 10753041.

English language Abstract of JP H02293500.

English language Abstract of JP 2007-321072.

* cited by examiner

CELLULOSE MATERIALS WITH NOVEL PROPERTIES

CROSS-REFERENCE TO RELATED APPLICATIONS

This application is a National entry of PCT/CA2010/000397 filed Mar. 17, 2010, in which the United States of America was designated and elected, and which remains pending in the International phase until Sep. 20, 2011, which application in turn claims priority under 35 USC 119(e) from U.S. Provisional application Ser. No. 61/202,631 filed Mar. 20, 2009.

BACKGROUND OF THE INVENTION

1. Technical Field

The invention relates to the field of production of cellulosic, lignocellulosic or cellulose materials such as pulps and papers with novel properties such as an embedded marker feature that can be distinguished from cellulosic, lignocellulosic or cellulose materials that do not have such a feature.

2. Background Art

The most dominant functional group in commercial papermaking pulps such as northern bleached softwood kraft (NBSK) pulp and bleached chemithermomechanical pulp (BCTMP) and in other cellulose materials such as cotton fibres and nanocrystalline cellulose (also referred to as cellulose nanocrystals) is the hydroxyl (—OH) group. This functional group has been used for chemical modification of papermaking pulps or other cellulose materials. Allan et al. have reacted the hydroxyl (—OH) group in unbleached and bleached kraft pulp with a dichloro-s-triazinyl dye molecule to introduce the dye molecule to the pulp. Dong and Roman have described the tagging of a fluorescent molecule to cellulose nanocrystals by reactions of the hydroxyl group (—OH) in the cellulose nanocrystals sequentially with an excessive amount of epichlorohydrin (555 mg epichlorohydrin per gram cellulose), ammonium hydroxide and fluorescein-5'-isothiocyanate.

Carbodiimide-mediated coupling reaction of a carboxyl (—COOH) group and a primary amino (H$_2$N—) group to form an amide bond [—C(O)—NH—] is a common reaction in organic chemistry, peptide syntheses and protein modification. This reaction, often referred to as amidation, is typically carried out in organic solvents using a lipid-soluble carbodiimide such as N,N'-dicyclohexylcarbodiimide (DCC), C$_6$H$_{11}$—N=C=N—C$_6$H$_{11}$, as the coupling agent. The reaction can also be performed in aqueous media using a water-soluble carbodiimide such as N-(3-dimethylaminopropyl)-N'-ethylcarbodiimide hydrochloride (also referred to as 1-ethyl-3-(3-(dimethylamino)propyl)carbodiimide hydrochloride) (EDC.HCl), CH$_3$CH$_2$—N=C=N—CH$_2$CH$_2$CH$_2$—N(CH$_3$)CH$_3$.HCl, as the coupling agent/activator [See references by Lonngren and Goldstein, and by Nakajima and Ikada]. Additives such as N-hydroxysuccinimide (NHS) or 1-hydroxybenzotriazole (HOBt) have been shown to improve the efficiency of such an aqueous reaction [See references by Sehgal and Vijay, and by Nozaki]. Amidation of cellulose carboxyl (—COOH) group in a hardwood bleached kraft pulp with methylamine hydrochloride (H$_2$NCH$_3$.HCl) in the presence of 1-ethyl-3-(3-dimethylaminopropyl)-carbodiimide HCl salt to reduce the carboxyl group content of the pulp has been briefly reported [See reference by Kitaoka et al.].

Immobilization of fluoresceinamine on cellulose solid support for potential use as pH sensor has been described [See reference by Saari and Seitz]. The said immobilization is achieved via reactions of cellulose with potassium hydroxide solution and then cyanuric chloride in acetone, followed by washing of the cyanuric chloride-reacted cellulose with water and acetone, and soaking of the cyanuric chloride-reacted cellulose in a fluoresceinamine solution in acetone. Immobilization of fluoresceinamine to synthetic co-polymers via reactions of the chloro (—Cl) or carboxyl (—COOH) groups with the primary amino (H$_2$N—) group in fluoresceinamine in organic solvents have also been reported [See references by Ham et al., and by Kang et al.].

Fluorescent whitening agents (FWA) [also referred to as optical brightening agents (OBA)] are commonly used in the paper industry to improve the optical properties such as ISO brightness of paper products. Most of the commercially available FWA are di-, tetra-, or hexa-sulphonated, 1,3,5-triazinyl derivatives of 4,4'-diaminostilbene. One example of such derivatives is tetrasodium 4,4'-bis[[4-[bis(2-hydroxyethyl)amino]-6-(4-sulphonatoanilino)-1,3,5-triazin-2-yl]amino] stilbene-2,2'-disulphonate] (commercially known as Tinopal ABP-A). FWA can be added at the wet end such as the machine chest of a papermaking process. However, the ISO brightness improvement of pulp and paper such as BCTMP and paper containing BCTMP is often limited due in part to the low affinity of the FWA to the pulp fibres.

Prior to the present invention, however, no primary or secondary amino-aryl compounds/molecules such as 5-aminofluorescein (also referred to as fluoresceinamine isomer I, or fluoresceinamine) or tetrasodium 4,4'-bis[[4-[bis(2-hydroxyethyl)amino]-6-(4-sulphonatoanilino)-1,3,5-triazin-2-yl]amino]stilbene-2,2'-disulphonate] (commercially known as Tinopal (trademark) ABP-A) have been permanently attached in aqueous media to a papermaking pulp or other cellulose materials such as cotton fibres, carboxymethyl cellulose, nanofibrillated cellulose and nanocrystalline cellulose.

DISCLOSURE OF THE INVENTION

It is an object of this invention to provide modified cellulosic, lignocellulosic or cellulose material having a foreign or an improved property.

It is another object of this invention to provide a process of producing a modified cellulosic, lignocellulosic or cellulose material having a foreign or an improved property.

It is yet another object of this invention to provide a papermaking pulp comprising a modified cellulosic, lignocellulosic or cellulose material of the invention.

It is still another object of this invention to provide a paper formed from a pulp of the invention.

It is a more specific object of the current invention to provide a method for the permanent attachment of a primary or secondary, amino-aryl fluorescent molecule, in particular, 5-aminofluorescein or Tinopal ABP-A, to a papermaking pulp or other cellulose materials in aqueous media.

It is another specific object of the current invention to provide a method for the production of a cellulose material furnish with an embedded marker feature using low doses (down to parts per million) of a marker, and a coupling agent/activator. The marker may be, for example, the above-mentioned amino-aryl fluorescent molecule, or a primary or secondary, amino-aryl FTIR- or Raman-detectable molecule. The coupling agent/activator may be, for example, a water-soluble carbodiimide such as 1-ethyl-3-(3-(dimethylamino)propyl)carbodiimide hydrochloride (EDC.HCl), CH$_3$CH$_2$—N=C=N—CH$_2$CH$_2$—N(CH$_3$)CH$_3$.HCl or N-cyclohexyl-N'-(2-morpholinoethyl)carbodiimide methylp-toluenesulfonate, $C_6H_{11}$—N=C=N—$CH_2CH_2$—N$^+$($CH_2CH_2OCH_2CH_2$)$CH_3$.$CH_3$-p-$C_6H_4SO_3^-$.

It is yet another specific object of the current invention to provide a method for the production of papers or other cellulose material-based documents with an embedded marker feature using low doses (down to parts per million) of the above-mentioned marker and coupling agent/activator.

It is still another specific object of the current invention to produce papers or other cellulose material-based documents with an embedded marker feature that can be detected by naked eye or fluorescence spectroscopy or microscopy upon UV or visible light excitation.

It is also another specific object of the current invention to provide a method for the production of pulps, papers or other cellulose materials with higher ISO brightness using a fluorescent whitening agent possessing a primary or secondary amino group, and the above-mentioned coupling agent/activator.

It is also another specific object of the current invention to produce pulps or other cellulose materials with novel properties by permanently attaching to the pulps or other cellulose materials, in aqueous media using a water-soluble carbodiimide as a coupling agent/activator, molecules possessing a primary or secondary amino group and additional functionalities; the novel properties being imparted by the said, additional functionalities in the molecules.

In accordance with one aspect of the invention there is provided a modified cellulosic, lignocellulosic or cellulose material comprising: a cellulosic, lignocellulosic or cellulose substrate bearing an amino modifier, said modifier being covalently linked through the amino of said modifier to a carboxyl of said substrate, said modifier having a functionality capable of introducing a foreign or an improved property into said substrate.

In accordance with another aspect of the invention there is provided a process of producing a modified cellulosic, lignocellulosic or cellulose material comprising covalently linking through an amido group (C(O)—NH or C(O)—NR), an amino modifier, through the amino of said modifier, to a carboxyl of a cellulosic, lignocellulosic or cellulose substrate, said modifier having a functionality capable of introducing a foreign or an improved property into said substrate.

In accordance with another aspect of the invention there is provided a paper comprising a modified papermaking pulp of the invention.

DESCRIPTION OF SCHEMES

Scheme 1 is a schematic representation of covalent bonding/permanent attachment of a molecule possessing a primary amino ($H_2N$—) group and an additional functionality to a cellulose material in aqueous media using a water-soluble carbodiimide as a coupling agent/activator:

Scheme 1

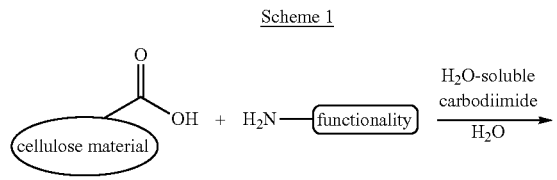

-continued

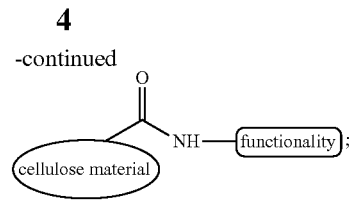

Scheme 2 is a schematic representation of covalent bonding/permanent attachment of 5-aminofluorescein ("A-fluo") to the NBSK pulp in aqueous media using EDC.HCl as a coupling agent/activator:

Scheme 2

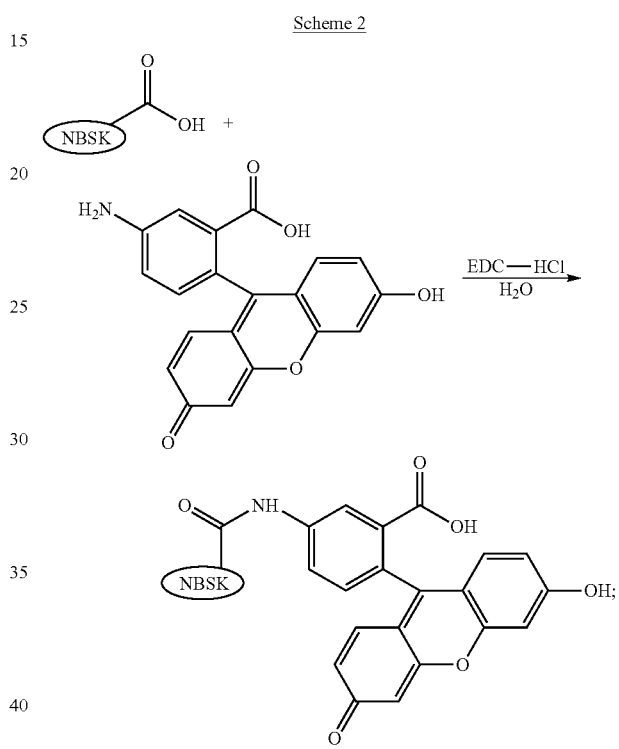

Scheme 3 is a schematic representation of covalent bonding/permanent attachment of 4-amino-TEMPO to the BTMP in aqueous media using EDC.HCl as a coupling agent/activator and HOBt as an additive:

Scheme 3

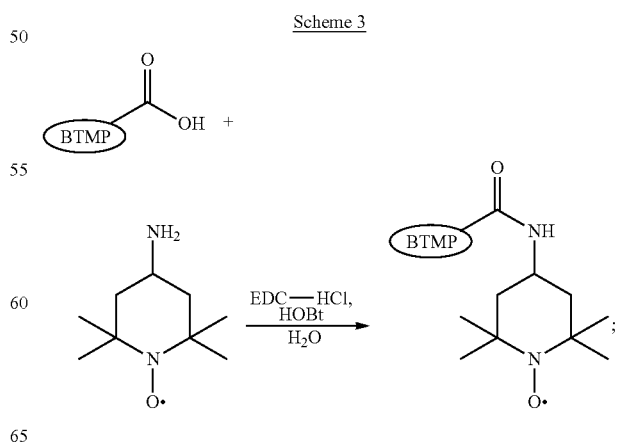

Scheme 4 is a schematic representation of covalent bonding/permanent attachment of a molecule possessing a secondary amino (HRN—) group and an additional functionality to a cellulose material in aqueous media using a water-soluble carbodiimide as a coupling agent/activator.

Scheme 4

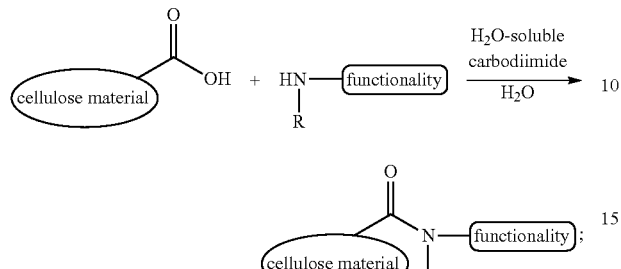

Scheme 5 is a schematic representation of covalent bonding/permanent attachment of Tinopal ABP-A to the BCTMP in aqueous media using EDC.HCl as a coupling agent/activator:

Scheme 6 is a schematic representation of covalent bonding/permanent attachment of copper (II) complex of L-ornithine to the BCTMP in aqueous media using EDC.HCl as a coupling agent/activator and the subsequent generation of the free α-amino-acid functionality in the pulp:

Scheme 6

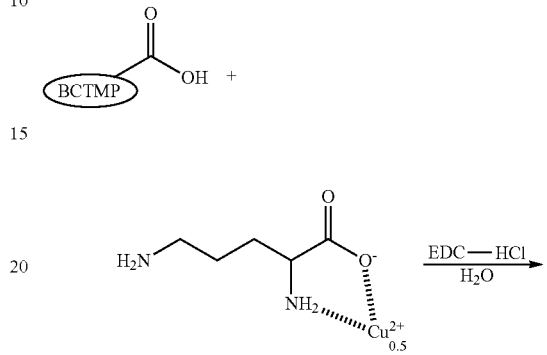

Scheme 5

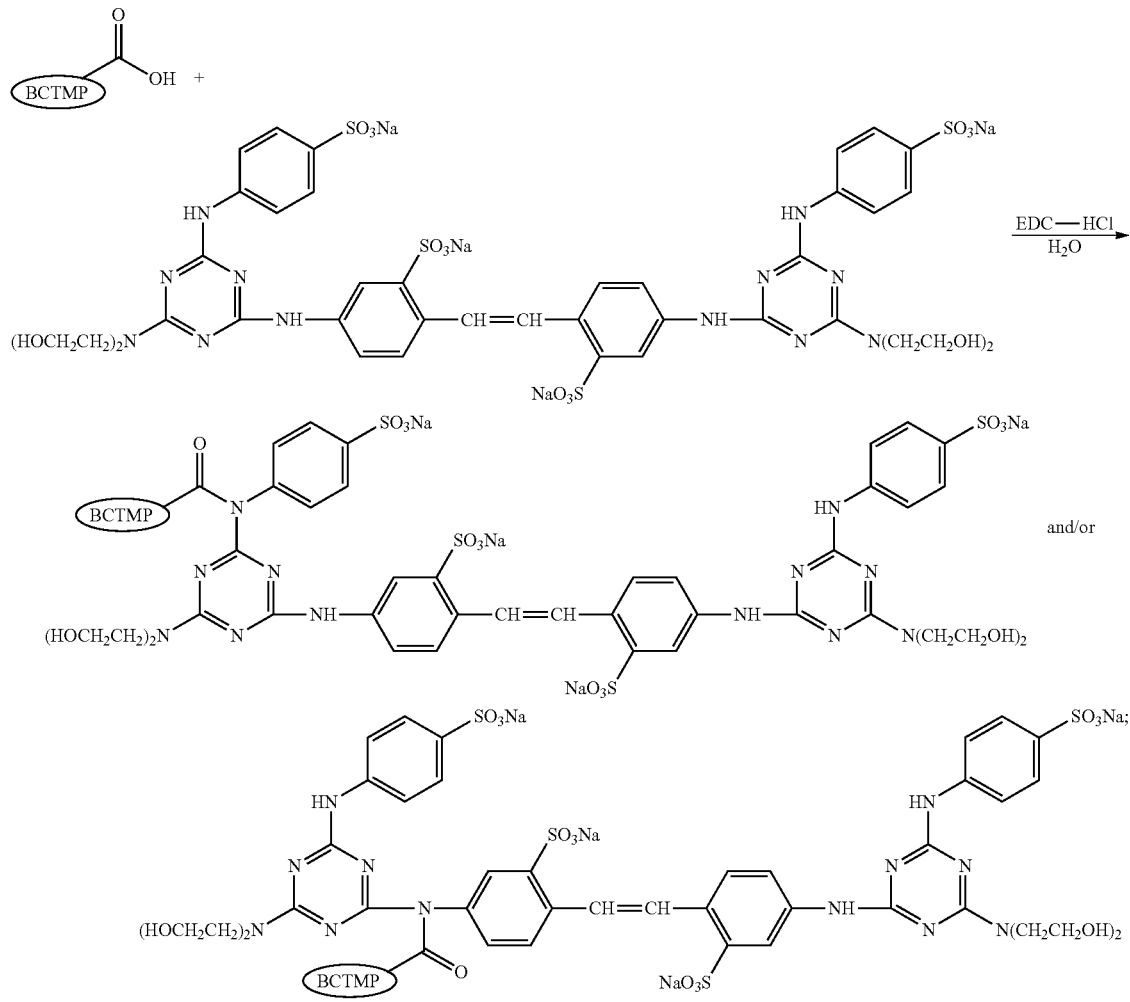

-continued

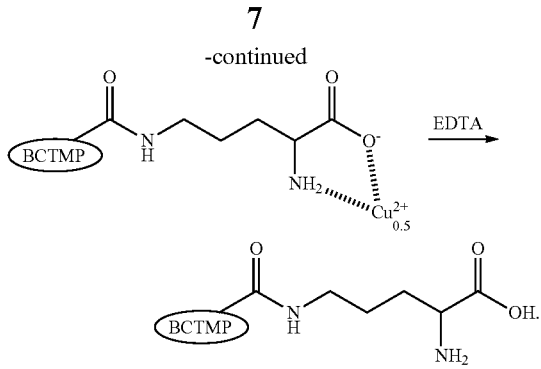

DETAILED DESCRIPTION OF THE INVENTION

The molecule/modifier capable of producing the modified cellulosic, lignocellulosic or cellulose material of the invention may be represented as:

YHN-AX    (I)

wherein YHN— is a primary or secondary amino, in particular Y is H in a primary amino; or an alkyl of 1 to 6, preferably 1 to 4 carbon atoms, or an aryl of $C_6H_5$ or $C_6H_{5-n}R_n$ where R is a carboxyl (COOH), carboxylate ($COO^-$), sulfonic ($SO_3H$) or sulfonate ($SO_3^-$) group and n is 1 or 2 in a secondary amino;
and -AX is a functional radical, or —X is a functional radical and -A- is an inert support or frame for the primary or secondary amino YHN— and the functional radical X. When R is a carboxylate ($COO^-$) or sulfonate ($SO_3^-$), a counter cation such as $Na^+$ is also present.

When -A- is a an inert support or frame it is a divalent organic radical which does not interfere with the primary or secondary amino or the function of the functional radical X.

When -AX is a functional radical it is in particular a monovalent organic radical which does not interfere with the amido (C(O)—NH or C(O)—NR) forming function of YHN—.

The functional radical —X or -AX serves to introduce into the cellulosic, lignocellulosic or cellulose material a foreign or an improved property which the material does not have naturally, for example a marking characteristic, or a whitening.

In this case the modified cellulosic, lignocellulosic or cellulose material can be represented by the formula (II):

Sub-C(O)—NY-AX    (II)

wherein:
Sub is a substrate of cellulosic, lignocellulosic or cellulose material; and Y, A and X are as defined above.

Specific embodiments which illustrate the invention are described hereinafter.

In one embodiment a primary or secondary, amino-aryl fluorescent molecule such as 5-aminofluorescein (also referred to as fluoresceinamine isomer I or fluoresceinamine) (abbreviated as "A-fluo"), 4-aminofluorescein (also referred to as fluoresceinamine isomer II), 4,4'-diamino-2,2'-stilbene-disulfonic acid (abbreviated as DSA) or tetrasodium 4,4'-bis[[4-[bis(2-hydroxyethyl)amino]-6-(4-sulphonatoanilino)-1,3,5-triazin-2-yl]amino]stilbene-2,2'-disulphonate] (abbreviated as Tinopal ABP-A) is permanently attached to a papermaking pulp such as NBSK pulp or bleached chemithermomechanical pulp (BCTMP), or other cellulose materials in aqueous media using a water-soluble carbodiimide such as 1-ethyl-3-(3-(dimethylamino)propyl)carbodiimide hydrochloride (EDC.HCl) or N-cyclohexyl-N'-(2-morpholinoethyl)carbodiimide methyl-p-toluenesulfonate as a coupling agent/activator with or without additives such as N-hydroxysuccinimide (NHS) or 1-hydroxybenzotriazole (HOBt).

The coupling agent/activator facilitates a condensation reaction, activating the carboxyl group of the cellulosic, lignocellulosic or cellulose material so that it reacts with the amino group of the modifier to form an amide linkage between the modifier and the cellulosic, lignocellulosic or cellulose material. Water-soluble carbodiimides represent an especially preferred class of coupling agent/activator. The carbodiimide links temporarily with the carboxyl group of the material to activate the carboxyl group, and the temporary intermediate reacts with the amino group of the modifier whereby the carbodiimide is effectively displaced as a water-soluble urea, having incorporated a molecule of water from the amide (C(O)—NH or C(O)—NR) formation. The reaction is illustrated schematically in Schemes 1 and 4.

In another embodiment a yellowing inhibitor (also referred to as radical scavenger or antioxidant) molecule possessing a primary or secondary amino group such as 4-amino-2,2,6,6-tetramethylpiperidine-N-oxyl (4-amino-TEMPO) is permanently attached to a papermaking pulp such as bleached thermomechanical pulp (BTMP), or other cellulose materials in aqueous medium using a water-soluble carbodiimide such as EDC.HCl as a coupling agent/activator with or without additives such as HOBt.

In still another embodiment α-amino-acids possessing also a terminal (ω-) amino group (also referred to as α,ω-diaminocarboxylic acids) such as D- or L-lysine, also referred to as (R)-(−)-2,6-diaminohexanoic acid or (S)-(+)-2,6-diaminohexanoic acid, D- or L-ornithine, also referred to as (R)-(−)-2,5-diaminopentanoic acid or (S)-(+)-2,5-diaminopentanoic acid, and (S)-(+)-2,4-diaminobutyric acid are permanently attached to a cellulosic, lignocellulosic or cellulose material such as chemithermomechanical pulp (BCTMP) in aqueous medium using a water-soluble carbodiimide such as EDC.HCl as a coupling agent/activator with or without additives such as HOBt. The attachment is preferably performed by first protecting the α-amino-acid as a copper (II) complex, reacting the unprotected, ω-amino group in the amino-acid copper II complex with the carboxyl group in the said cellulosic, lignocellulosic or cellulose material, and finally treating the reacted material with a chelating agent such as ethylenediaminetetraacetic acid (EDTA) or diethylenetriaminopentaacetic acid (DTPA) to give the said material permanently attached with an α-amino-acid functionality.

In still another embodiment an "A-fluo"-attached NBSK pulp prepared using, for example, 0.50% [based on oven-dried (od) pulp, abbreviated as od pulp] of "A-fluo", 0.50% (od pulp) of EDC.HCl and 0.10% (od pulp) of HOBt, and the paper made from a pulp furnish containing a small portion of such a pulp show an embedded marker feature that can be detected, upon UV or visible light excitation, by naked eye or fluorescence spectroscopy or microscopy.

In yet another embodiment a DSA-attached NBSK pulp prepared using, for example, 0.45% (od pulp) of DSA and 0.50% (od pulp) of EDC.HCl, and the paper made from a pulp furnish containing such a pulp show an embedded marker feature that can be detected, upon UV or visible light excitation, by naked eye or fluorescence spectroscopy or microscopy.

In a further embodiment a 4-amino-TEMPO-attached BTMP prepared using, for example, 1.0% (od pulp) of 4-amino-TEMPO, 2.0% (od pulp) of EDC.HCl and 0.20% (od pulp) of HOBt, and the paper made from the 4-amino- TEMPO-attached BTMP show much improved brightness stability over the original BTMP and paper made from the original BTMP during ambient light exposure.

In still a further embodiment a Tinopal ABP-A-attached BCTMP prepared using, for example, 2.0% (od pulp) of Tinopal ABP-A, 2.0% (od pulp) of EDC.HCl, and the paper made from the Tinopal ABP-A-attached BCTMP show much higher ISO brightness than the original BCTMP and paper made from the original BCTMP.

In a still further embodiment an L-ornithine-attached BCTMP prepared using, for example, 1.9% (od pulp) of a copper (II) complex of L-ornithine, 2.0% (od pulp) of EDC.HCl, and subsequently 2.0% (od pulp) of EDTA, and the paper made from the L-ornithine-attached BCTMP show improved strength properties over the original BCTMP and paper made from the original BCTMP.

Furthermore, a pulp or other cellulose material furnish of the invention, prepared from the dilution of a fluorescent molecule-attached NBSK pulp or other cellulose materials with the original NBSK pulp or other original cellulose materials by a factor of, for example, $10^4$, or the paper or document prepared from the said furnish, still show the embedded marker feature. The said furnish or the paper or document prepared from the said furnish can be distinguished by naked eye or fluorescence microscopy or spectroscopy upon UV or visible light excitation from a furnish, a paper or a document containing no fluorescent molecule-attached pulp or other cellulose materials. The amounts of the fluorescent molecule, EDC.HCl and HOBt needed to make such a pulp or other cellulose material furnish, or such a paper or other documents, with the said embedded marker feature are in parts per million (ppm) on pulp or other cellulose materials, for example, 0.50 ppm (od pulp) of "A-fluo", 0.50 ppm (od pulp) of EDC.HCl, and 0.10 ppm (od pulp) of HOBt.

In yet a further embodiment two or more than two different fluorescent molecules are permanently attached to one or more than one pulp or other cellulose materials, respectively. The pulp (or pulps) or other cellulose materials attached with two or more than two different fluorescent molecules can be diluted with the original pulp (or pulps) or other cellulose materials to give a furnish from which authenticable cellulose material can be made.

Moreover, a molecule possessing a primary or secondary amino group and an additional functionality different from the additional functionality in "A-fluo", 4-aminofluorescein, DSA, 4-amino-TEMPO, Tinopal ABP-A, L-lysine or L-ornithine can be permanently attached, in aqueous media using a water-soluble carbodiimide as a coupling agent/activator, to a cellulosic, lignocellulosic or cellulose material such as a papermaking pulp to provide the materials with a novel property; the novel property being imparted by the said, additional functionality in the said molecule.

In accordance with a specific embodiment of the invention, there is provided a method for the permanent attachment of an amino-aryl fluorescent or FTIR- or Raman-detectable molecule, an amino-yellowing inhibitor molecule, or an α,ω-diaminocarboxylic acid to a papermaking pulp or other cellulose materials via the reaction between the amino or ω-amino group in the said molecule and the carboxyl group of the said pulp or other cellulose materials using a water-soluble carbodiimide as the coupling agent/activator.

An amino-aryl molecule in the present specification includes, but is not limited to a primary or secondary amino aromatic molecule of the general formula of $H_2N$—$C_6H_3RR'$, or $H(R')N$—$C_6H_3R_2$, $H(R')N$—$C_6H_4R$ or $H(R')N$—$C_6H_5$ wherein R is a carboxyl (COOH), carboxylate ($COO^-$), sulfonic ($SO_3H$) or sulfonate ($SO_3^-$) group; and R' is an additional functionality. When R is a carboxylate ($COO^-$) or sulfonate ($SO_3^-$), a counter cation such as $Na^+$ is also present.

A fluorescent whitening agent in the present specification refers to a compound or molecule that absorbs UV light at ~200-400 nm that is present in day light or common office lights, and emits light at a longer wavelength, usually in the range of 420-500 nm.

A fluorescent compound or molecule in the present specification includes, but is not limited to a fluorescent whitening agent. It refers to a molecule that absorbs UV and/or visible light at ~200-550 nm, and emits light at a longer wavelength when excited with UV or visible light preferably but not necessarily at a wavelength at which or near which the molecule shows a maximum UV or visible light absorption, $\lambda_{max}$.

A FTIR- or Raman-detectable molecule in the present specification refers to a molecule that has a FTIR or Raman peak that is readily distinguishable from FTIR or Raman peaks for the said pulp or other cellulose materials.

An additional functionality in the present specification refers an organic radical (or structural unit) that is other than a short-chain alkyl radical (.$C_nH_{2n+1}$; n=1, 2 or 3) and that is capable of providing cellulose materials a novel or improved property. More especially the functionality provides a foreign or improved property to the cellulose materials. Foreign property herein refers to a property not naturally present in the cellulose materials.

In particular the foreign or improved property is a property which enhances the value of the cellulosic, lignocellulosic or cellulose materials. By way of example the property may be a marker useful in security papers, or a whitening or yellow inhibiting property introduced into pulp or paper, or an α-amino acid function for peptide synthesis, protein engineering or further bio-functionalization.

The terms "cellulosic material", "lignocellulosic material" and "cellulose material" as employed herein, identify materials characterized by the presence of a cellulose and/or hemicellulose structure. Thus cellulosic materials, lignocellulosic materials and cellulose materials in the present specification refer to cellulose and/or hemicelluloses with various degrees of crystallinity and/or polymerization and with various lignin contents, materials containing the said cellulose and/or hemicelluloses, and chemical derivatives of the said cellulose or hemicelluloses. They also refer to starches—the polymers that have the same monomer as cellulose, and derivatives of starches. They include, but are not limited to, papermaking pulps, papers, cotton fibres, regenerated cellulose, carboxymethyl cellulose (CMC), microcrystalline cellulose, microfibrillated cellulose, nanofibrillated cellulose, nanocrystalline cellulose, native starches and cationic starches.

In another aspect of the invention, there is provided a method for the permanent attachment of 5-aminofluorescein (abbreviated as "A-fluo") ($\lambda_{max}$=~490 nm, $\lambda_{emission}$=~515 nm) to the said pulp or other cellulose materials using 1-ethyl-3-(3-(dimethylamino)propyl)carbodiimide hydrochloride (EDC.HCl) as the coupling agent/activator with or without additives such as N-hydroxysuccinimide (NHS) or 1-hydroxybenzotriazole (HOBt).

In yet another aspect of the invention, there is provided a method for the permanent attachment of 4,4'-diamino-2,2'-stilbenedisulfonic acid (abbreviated as DSA) ($\lambda_{max}$=~340 nm, $\lambda_{emission}$=~445 nm) to the said pulp or other cellulose materials using EDC.HCl as the coupling agent with or without additives such as NHS or HOBt.

In still another aspect of the invention, there is provided a method for the permanent attachment of 4-amino-2,2,6,6-tetramethylpiperidine-N-oxyl (4-amino-TEMPO) to the said pulp or other cellulose materials using EDC.HCl as the coupling agent with or without additives such as NHS or HOBt.

In another aspect of the invention, there is provided a method for the permanent attachment of Tinopal ABP-A to the said pulp or other cellulose materials using EDC.HCl as the coupling agent with or without additives such as NHS or HOBt.

In another aspect of the invention, there is provided a method for the permanent attachment, via the ω-amino group, of an α,ω-diaminocarboxylic acid such as (S)-(+)-2,4-diaminobutyric acid, L-lysine or L-ornithine to the said pulp or other cellulose materials using EDC.HCl as the coupling agent/activator with or without additives such as NHS or HOBt.

The amount of a fluorescent molecule such as "A-fluo", Tinopal ABP-A or DSA, a FTIR- or Raman-detectable molecule, a yellowing inhibitor molecule, or an α,ω-diaminocarboxylic acid that can be permanently attached to a pulp or other cellulose materials depends on the carboxyl (—COOH) group content and/or carboxyl group accessibility of the pulp or other cellulose materials, and the amounts of the said molecule, the said coupling agent/activator and the said additive. It also depends on the reaction conditions such as the order for the addition of the said molecule, coupling agent/activator and additive, the pH, temperature, time and consistency. The carboxyl group content of the pulp or other cellulose materials can be increased using any chemical or enzymatic treatment that is known to produce additional carboxyl group in the pulp or other cellulose materials. The carboxyl group accessibility of the pulp fibres or other cellulose materials can be increased using any mechanical treatment such as pulp refining that is known to increase the accessibility of the carboxyl group. Consistency (Cs) is defined as the weight percentage of a pulp (or other cellulose materials) in a pulp (or other cellulose materials) and water mixture.

Preferably, the reaction is performed at 0.1-40% Cs, pH 3.0-8.0, room temperature (~20° C.)-90° C. for 10 min-24 h using 0.01-5.0% (od pulp) of a fluorescent, a FTIR- or Raman-detectable molecule, a yellowing inhibitor or an α,ω-diaminocarboxylic acid, 0.01-5.0% (od pulp) of a water-soluble carbodiimide coupling agent/activator, and 0.0-1.0% (od pulp) of the additive, NHS or HOBt. More preferably, the reaction is performed at 1.0-30% Cs, pH 3.5-5.5, room temperature (~20° C.) for 30 min-4 h using 0.1-3.0% (od pulp) of a fluorescent, a FTIR- or Raman-detectable molecule, a yellowing inhibitor, or an α,ω-diaminocarboxylic acid, 0.1-3.0% (od pulp) of a water-soluble carbodiimide coupling agent/activator.

In yet another aspect of the invention there is provided a pulp or other cellulose material furnish containing the fluorescent molecule (or FTIR-detectable molecule or Raman-detectable molecule)-attached pulp or other said molecule-attached cellulose materials as the sole component or as one of the pulp or other cellulose material components. The said pulp or other cellulose material furnish is detectable by naked eye or fluorescence spectroscopy or microscopy upon UV or visible light excitation, or by FTIR or Raman spectroscopy or microscopy.

The pulp or other cellulose material furnish containing the fluorescent molecule (or FTIR-detectable molecule or Raman-detectable molecule)-attached pulp or other said molecule-attached cellulose materials as one of the components in the furnish can be prepared by blending of the said molecule-attached pulp or other cellulose materials with the original pulp or other original cellulose materials at 0.01-30% Cs, pH 4.0-8.0, room temperature (~20° C.)-90° C. for 30 seconds-2 hours. The ratio of the said molecule-attached pulp or other said molecule-attached cellulose materials to the original pulp or other original cellulose materials can be in a range of 1/99 to 1/99999 by weight, preferably in a range of 1/99 to 1/9999 by weight.

In still another aspect of the invention there is provided a paper sheet or other cellulose material-based documents made from the pulp or other cellulose material furnish of the invention, as described hereinbefore, and detectable by naked eye or fluorescence spectroscopy or microscopy upon UV or visible light excitation, or by FTIR or Raman spectroscopy or microscopy.

In yet another aspect of the invention there is provided a pulp or other cellulose material furnish containing the yellowing inhibitor-attached pulp or other said molecule-attached cellulose materials as the sole component or as one of the pulp or other cellulose material components. The said pulp or other cellulose material furnish has improved brightness stability during light exposure.

In still another aspect of the invention there is provided a paper sheet or other cellulose material-based documents made from the pulp or other cellulose material furnish of the invention, as described hereinbefore, with improved brightness stability during light exposure.

In another aspect of the invention there is provided a pulp or other cellulose material furnish containing the fluorescent whitening agent-attached pulp or other said molecule-attached cellulose materials as the sole component or as one of the pulp or other cellulose material components. The said pulp or other cellulose material furnish has higher ISO brightness.

In another aspect of the invention there is provided a pulp or other cellulose material furnish containing the α,ω-diaminocarboxylic acid-attached pulp or other said molecule-attached cellulose materials as the sole component or as one of the pulp or other cellulose material components. The said pulp or other cellulose material furnish has improved strength properties. The said pulp or other cellulose material furnish has an α-amino-acid group for peptide synthesis, protein engineering or further bio-functionalization.

In still another aspect of the invention there is provided a paper sheet or other cellulose materials made from the pulp or other cellulose material furnish of the invention, as described hereinbefore, with improved strength properties or with an α-amino-acid group for peptide synthesis, protein engineering or further bio-functionalization.

In yet another aspect of the invention there is provided a general method for producing a cellulose material with a novel or improved property by permanent attaching to the cellulose material, in aqueous media using a water-soluble carbodiimide as a coupling agent/activator, a molecule possessing a primary or secondary amino group and an additional functionality; the novel or improved property being imparted by the said, additional functionality in the said molecule. Scheme 1 is a schematic representation of permanent attachment of a molecule possessing a primary amino ($H_2N$—) group and an additional functionality to a cellulose material in aqueous media using a water-soluble carbodiimide as a coupling agent/activator.

Unless indicated otherwise herein, parts by % refers to % weight.

The present invention is illustrated by, but not limited to, the following examples:

General Procedure A: Permanent Attachment of a Fluorescent or FTIR- or Raman-detectable Molecule to a Papermaking Pulp or Other Cellulose Materials Unless otherwise specified, a known amount of deionized (DI) water ($H_2O$) (typically 325 mL) which when combined with 5.0 g [based on oven-dried (od) weight] of a pulp or other cellulose materials will give 1.50±0.03% consistency (Cs) is measured out. To this water is added, unless otherwise specified, 0.50% (od pulp) (i.e. 25.0 mg) of a fluorescent or FTIR- or Raman-detectable molecule (See also General Procedure B). When necessary, a small amount of 1.0 N sodium hydroxide, NaOH, is added to assist in a complete dissolution of the said molecule. The solution and 25 mg (i.e. 0.50% on od pulp or other cellulose material) of EDC.HCl are then added to 5.0 g (od) of the pulp or other cellulose materials in a 500-mL beaker to give a pulp or other cellulose material slurry. The pH of the slurry is then adjusted, unless otherwise specified, to 4.9±0.1 under stirring and left at room temperature (~20° C.) for 16 h. The pulp or other cellulose materials is/are filtered. An aliquot of the filtrate (typically 1.0 mL) is withdrawn for UV-Vis spectroscopic analysis. The pulp or other cellulose material slurry is then diluted with DI $H_2O$ to ~0.5% Cs, filtered with filtrate recycling, and washed with DI $H_2O$. The same dilution, filtration and washing are repeated one more time.

General Procedure B: Determination of the Precise Amount of "A-Fluo" or DSA Used for the Reaction with a Papermaking Pulp and the Amount of "A-Fluo" or DSA Attached to the Pulp Aliquots (1.0 mL each) of an "A-fluo" (or DSA) solution (typically 25.0 mg as measured on an analytical balance and dissolved in 325 mL DI $H_2O$), and of the filtrate withdrawn at the end of the pulp reaction according to General Procedure A, are diluted with known amounts of DI $H_2O$ so that the UV-Vis absorbance of the diluted solutions is <1.0. The pH values of the diluted, "A-fluo" solution and of the diluted filtrate from the pulp reaction with "A-fluo" are adjusted with one small drop (<5 μL) of 1.0 N NaOH to 9.0-11.0. UV-Vis spectra were recorded from 300-600 nm (or 190-500 nm). The precise amount of "A-fluo" (or DSA) used for the reaction, and the "A-fluo" (or DSA) concentrations in the pulp slurry at the beginning of the reaction and in the filtrate, are then calculated from the measured absorbances at $\lambda_{489}$ nm (or $\lambda_{340}$ nm), the separately determined molar absorptivity ($\epsilon$) of "A-fluo" (or DSA) (for "A-fluo": $\epsilon$=82,000 $M^{-1}cm^{-1}$, at pH>8.0 and $\lambda_{489}$ nm; and for DSA: $\epsilon$=24,000 $M^{-1}cm^{-1}$ at $\lambda_{340}$ nm), the path length (1.0 cm) of the cell used for measuring the UV-Vis spectra of the solutions, the volume of the "A-fluo" (or DSA) solution (typically 324 mL) used for the reaction, the amount of water present in the pulp used for the reaction (typically 9.0 mL per 5.0 g od pulp), and the dilution factors used for preparing the diluted solutions for measuring the UV-Vis spectra. The amount of "A-fluo" (or DSA) attached to the pulp is calculated from the difference between the "A-fluo" (or DSA) concentrations in the pulp slurry at the beginning of the reaction and in the filtrate.

General Procedure C: Preparation of a Pulp Furnish Containing a Fluorescent or FTIR- or Raman-detectable Molecule-Permanently-Attached Pulp as One of the Pulp Components A known amount of the fluorescent or FTIR- or Raman-detectable molecule-attached pulp obtained according to General Procedure A disclosed above is combined with a known amount of the original pulp at a known ratio (typically 1/99 to 1/9999 od weight/weight ratio) and a known amount of DI $H_2O$ to give a 1.5% Cs pulp slurry. The pulp slurry is stirred at room temperature (~20° C.) for 20 minutes. The pulp slurry is then filtered with filtrate recycling and washed with DI $H_2O$.

General Procedure D: Handsheet Preparation and Determination of ISO Brightness

Handsheets (60±1.0 $g/m^2$) of the original pulp (1.2 g od) and of the pulp (1.2 g od) obtained according to General Procedure A or General Procedure C disclosed above are prepared based on the procedure described in PAPTAC Test Methods, Standard C.5. The ISO brightness values of the sheets are determined on a Technibrite Micro TB-1C instrument based on the procedure described in PAPTAC Test Methods, Standard E.1.

General Procedure E: Fluorescence Microscopy Authentication of a Handsheet

A sample (~1.0 cm×1.0 cm) of a handsheet (60±1.0 $g/m^2$) obtained from a pulp furnish containing a fluorescent molecule-attached pulp as one of the pulp components according to General Procedures A, C and D is, unless otherwise specified, immersed in an immersion oil (Zeiss Immersol 518 F immersion oil), placed on a standard microscope slide and mounted with a #1 thickness cover slip.

The mounted sample is imaged with a Nikon Microphot-FXA epi-fluorescence microscope equipped with a Nikon 100-W mercury arc lamp, and a Nikon 4× (0.10 NA) objective combined with an 1.25× intermediate magnification changer. Light excitation at, unless otherwise specified, 450-490 nm, is used to generate fluorescence within the sample, a B-2A (B2) filter cube is used for signal collection, and the resulting fluorescence images are acquired using a Spot Flex digital camera.

EXAMPLE 1

A commercial northern bleached softwood kraft (NBSK) pulp (5.0 g od) was reacted with 0.48% (od pulp) of 5-aminofluorescein ("A-fluo") and 0.50% (od pulp) of EDC.HCl according to the General Procedure A disclosed above except that 0.10% (od pulp) of HOBt was also added. A separate (control) reaction was also performed on 5.0 g (od) of the NBSK pulp according to General Procedure A disclosed above except that 0.0% of EDC.HCl and 0.0% of HOBt were used for the reaction. The amount of "A-fluo" attached to the NBSK was determined to be 0.063% (od pulp), according to General Procedure B disclosed above, for the reaction of the pulp with 0.50% (od pulp) of "A-fluo", 0.50% (od pulp) of EDC.HCl and 0.10% (od pulp) of HOBt. No "A-fluo" was found to attach to the NBSK pulp, according to General Procedure B disclosed above, for the control reaction of the pulp with 0.50% (od pulp) of "A-fluo", 0.0% of EDC.HCl and 0.0% of HOBt.

The NBSK pulp attached with 0.063% (od pulp) of "A-fluo" (abbreviated as "A-fluo"-attached NBSK pulp) (% ISO brightness=37.1) was combined with the original NBSK pulp at a ratio (od weight/weight) of 1/9999 according to General Procedure C disclosed above. Handsheet of the combined pulp and ISO brightness value of the handsheet were prepared and determined, respectively, according to General Procedure D disclosed above. Fluorescence microscopy image of a sample (1.0 cm×1.0 cm) of the handsheet was obtained according to General Procedure E disclosed above. The handsheet made from "A-fluo"-attached NBSK pulp and the original NBSK pulp at a ratio (od weight/weight) of 1/9999 has the same brightness (% ISO brightness=85.5) as, and is visually indistinguishable from, the handsheet made from the original NBSK pulp. However, it can be readily authenticated by naked eye or by fluorescence microscopy upon excitation with visible light at 450-490 nm, due to the yellow-green fluorescence emission (at ~515 nm) of the "A-fluo" molecules in the "A-fluo"-attached NBSK pulp. A fluorescence microscope image was taken of a sample of handsheet made from "A-fluo"-attached NBSK pulp and the original NBSK pulp at a weight/weight (od basis) ratio of 1/9999. In the fluorescence image of the handsheet sample upon the said light excitation, the "A-fluo"-attached NBSK fibre in the sheet sample appears as a green fibre because of the yellow-green fluorescence emission (at ~515 nm) of the "A-fluo" molecules in the "A-fluo"-attached NBSK fibre.

Because of the very little amount of the "A-fluo"-attached NBSK pulp used, the amounts of "A-fluo", EDC.HCl, and HOBt needed to prepare a pulp furnish or a paper containing "A-fluo"-attached NBSK pulp and the original NBSK pulp at 1/9999 weight ratio are 0.48, 0.50 and 0.10 part per million (ppm) on the pulp fibres.

EXAMPLE 2

A commercial NBSK pulp (5.0 g od) was reacted with 0.49% (od pulp) of "A-fluo" and 0.50% (od pulp) of EDC.HCl according to the General Procedure A disclosed above except that the pH of the pulp slurry was adjusted to 4.0±0.1 under stirring and that the pulp slurry was left at room temperature (~20° C.) for 2 h. The amount of "A-fluo" attached to the NBSK pulp was determined to be 0.106% (od pulp), according to General Procedure B disclosed above. Scheme 2 is a schematic representation of permanent attachment of 5-aminofluorescein ("A-fluo") to the NBSK pulp in aqueous media using EDC.HCl as a coupling agent.

EXAMPLE 3

A commercial NBSK pulp (5.0 g od) was reacted with 0.50% (od pulp) of "A-fluo" and 0.50% (od pulp) of EDC.HCl according to the General Procedure A disclosed above except that the pH of the pulp slurry was adjusted to 4.0±0.1 under stirring and that the pulp slurry was heated at 65° C. for 2 h. The amount of "A-fluo" attached to the NBSK pulp was determined to be 0.058% (od pulp), according to General Procedure B disclosed above.

EXAMPLE 4

A 1.50% Cs NBSK pulp slurry was prepared from 5.0 g (od) of a pulp and DI $H_2O$. The pH of the pulp slurry was adjusted to 4.5±0.1 under stirring. The pulp slurry was then dewatered, with the filtrate being recycled once to recover the fines, to ~30% Cs. The wet weight of the dewatered pulp was measured. A known amount of DI $H_2O$ which when combined with the dewatered pulp would give 5.0% Cs was measured out. To this water was added 0.50% (od pulp) of "A-fluo" and a small amount of 1.0 N sodium hydroxide to assist in a complete dissolution of "A-fluo", and 0.50% (od pulp) of EDC.HCl. The pH of the solution was adjusted to 4.5±0.1, and the solution was added to the dewatered pulp. The pulp was left at RT (~20° C.) for 17 h. The pulp was diluted with a known amount of DI $H_2O$ to 1.50% Cs and briefly stirred. An aliquot of the filtrate (~1.0 mL) was withdrawn for UV-Vis spectroscopic analysis. The pulp slurry was diluted with DI $H_2O$ to ~0.5% Cs, filtered with filtrate recycling, and washed with DI $H_2O$. The same dilution, filtration and washing were repeated one more time. The amount of "A-fluo" attached to the NBSK pulp was determined to be 0.094% (od pulp), according to General Procedure B disclosed above.

EXAMPLE 5

A commercial NBSK pulp (5.0 g od) was reacted with 0.58% (od pulp) of 4,4'-diamino-2,2'-stilbenedisulfonic acid (abbreviated as DSA) and 0.50% (od pulp) of EDC.HCl according to General Procedure A disclosed above except that the pH of the pulp slurry was adjusted to 4.5±0.1 under stirring. A separate control reaction was also performed on 5.0 g (od) of the NBSK pulp according to General Procedure A disclosed above except that 0.0% of EDC.HCl was used for the reaction and that the pH of the pulp slurry was adjusted to 4.5±0.1 under stirring. The amount of DSA attached to the NBSK pulp was determined to be 0.107% (od pulp), according to General Procedure B disclosed above, for the reaction of the pulp with 0.58% (od pulp) of DSA and 0.50% (od pulp) of EDC.HCl. No DSA was found to attach to the NBSK pulp for the control reaction of the pulp with 0.58% (od pulp) of DSA and 0.0% of EDC.HCl, according to General Procedure B disclosed above.

EXAMPLE 6

A commercial NBSK pulp (5.0 g od) was reacted with 2.2% (od pulp) of DSA and 2.0% (od pulp) of EDC.HCl according to General Procedure A disclosed above except that the pH of the pulp slurry was adjusted to 4.5±0.1 under stirring and that the pulp slurry was left at room temperature for 21 h. A separate control reaction was also performed on 5.0 g (od) of the NBSK pulp according to General Procedure A disclosed above except that 0.0% of EDC.HCl was used for the reaction and that the pH of the pulp slurry was adjusted to 4.5±0.1 under stirring and the pulp slurry was left at room temperature for 21 h. The amount of DSA attached to the NBSK pulp was determined to be 0.286% (od pulp), according to General Procedure B disclosed above, for the reaction of the pulp with 2.2% (od pulp) of DSA and 2.0% (od pulp) of EDC.HCl. No DSA was found to attach to the NBSK pulp for the control reaction of the pulp with 2.2% (od pulp) of DSA and 0.0% of EDC.HCl, according to General Procedure B disclosed above.

EXAMPLE 7

A commercial aspen bleached chemithermomechanical pulp (BCTMP) (5.0 g od) was reacted with 2.2% (od pulp) of DSA and 2.0% (od pulp) of EDC.HCl according to General Procedure A disclosed above except that the pH of the pulp slurry was adjusted to 4.5±0.1 under stirring and the pulp slurry was left at room temperature for 19 h. A separate control reaction was also performed on 5.0 g (od) of the aspen BCTMP according to General Procedure A disclosed above except that no EDC.HCl was used for the reaction and that the pH of the pulp slurry was adjusted to 4.5±0.1 under stirring and the pulp slurry was left at room temperature for 19 h. The amount of DSA attached to the BCTMP was determined to be 0.542% (od pulp), according to General Procedure B disclosed above, for the reaction of the pulp with 2.2% (od pulp) of DSA and 2.0% (od pulp) of EDC.HCl. No DSA was found to attach to the BCTMP for the control reaction of the pulp with 2.2% (od pulp) of DSA and 0.0% of EDC.HCl, according to General Procedure B disclosed above.

EXAMPLE 8

A commercial NBSK pulp (5.0 g od) was reacted with 0.49% (od pulp) of "A-fluo" and 0.50% (od pulp) of N-cyclohexyl-N'-(2-morpholinoethyl)carbodiimide methyl-p-toluenesulfonate according to the General Procedure A disclosed above except that the pH of the pulp slurry was adjusted to 4.5±0.1 under stirring and that the pulp slurry was left at room temperature (~20° C.) for 2 h. The amount of "A-fluo" attached to the NBSK pulp was determined to be 0.020% (od pulp), according to General Procedure B disclosed above.

EXAMPLE 9

A commercial NBSK pulp (10 g od) was reacted with 0.48% (od pulp) of "A-fluo" and 0.50% (od pulp) of EDC.HCl according to General Procedure A disclosed above except that the pH of the pulp slurry was adjusted to 4.0±0.1 under stirring and that the pulp slurry was left at room temperature (~20° C.) for 2 h. At the end of the reaction, the pulp slurry was filtered to give 640 mL of filtrate. An aliquot of the filtrate was removed for UV-Vis spectroscopic analysis. The concentration of "A-fluo" in the filtrate, and the amount of "A-fluo" attached to the NBSK pulp, were determined to be 55.9 µg/mL and 0.104% (od pulp), respectively, according to Procedure B disclosed above.

Next, 447 mL of the filtrate containing 25.0 mg of "A-fluo" was combined with 5.0 g (od) of a commercial NBSK pulp and 25 mg of EDC.HCl to give a 1.1% Cs pulp slurry. The pH of the pulp slurry was adjusted to 4.0±0.1 under stirring and the pulp slurry was left at room temperature (~20° C.) for 2 h. The pulp slurry was processed according to General Procedure A disclosed above. The amount of "A-fluo" attached to the NBSK pulp, using the filtrate from the previous reaction as a source of "A-fluo", was determined to be 0.082% (od pulp), according to General Procedure B disclosed above. In a separate experiment, a sample of the same commercial NBSK pulp (5.0 g od) was reacted with 0.50% (od pulp) of "A-fluo" (as purchased) and 0.50% (od pulp) of EDC.HCl according to General Procedure A disclosed above except that the Cs and the pH of the pulp slurry were adjusted to 1.1% and 4.0±0.1, respectively, and that the pulp slurry was left at room temperature (~20° C.) for 2 h. The amount of "A-fluo" attached to the NBSK pulp was determined to be 0.082% (od pulp), according to General Procedure B disclosed above. These experiments show that the "A-fluo" in the filtrate can be recycled and reused without any decrease of reactivity.

EXAMPLE 10

A spruce bleached thermomechanical pulp (BTMP) (4.0 g od) was reacted with 1.0% (od pulp) of 4-amino-2,2,6,6-tetramethylpiperidine-N-oxyl (4-amino-TEMPO), 2.0% (od pulp) of EDC.HCl, and 0.2% (od pulp) of HOBt according to General Procedure A disclosed above except that the pH of the pulp slurry was adjusted to 6.0-6.5 under stirring and the pulp slurry was left at room temperature (~20° C.) for 3 h. After the reaction, the pulp slurry was diluted with DI $H_2O$ to 0.5-1.0% Cs, filtered with recycling of fines and washed with DI $H_2O$. The pulp was then stirred at pH 3.5±0.1 and 1.5% Cs, room temperature (~20° C.) for 3 h. The pulp slurry was diluted with DI $H_2O$ to 0.5-1.0% Cs, filtered with recycling of fines and washed with DI $H_2O$ to give the BTMP attached with 4-amino-TEMPO. Handsheets (200 g/m$^2$) of the 4-amino-TEMPO-attached BTMP, and the original BTMP were prepared. Samples of the handsheets were exposed to ambient office light by placing the samples on an office desk under normal, full spectrum fluorescent office lights at a distance of about six feet with the light being on 24 hours a day. Measurements of the % ISO brightness of the samples were performed at different time intervals on a Technibrite Micro TB-1C instrument according to TAPPI Test Methods, T525 om-02 (except that only a single ply of a 200 g/m$^2$ sheet sample is used over a black background) and converted to post color number (PC number). PC number is defined as follows:

$$PC=[(k/s)_{after}-(k/s)_{before}]\times 100$$

$$k/s=(1-R_{inf})^2/2R_{inf}$$

where k and s are the absorption and scattering coefficients, respectively, and $R_{inf}$ is the value of ISO brightness. The relationship between $R_{inf}$ and the chromophore concentration is non-linear while the PC number is roughly linear to the concentration of the chromophore. The lower the PC number is, the less yellow (brighter) the sample.

Table 1 shows the PC numbers of the original BTMP, and the 4-amino-TEMPO-attached BTMP versus the ambient office light exposure times. The 4-amino-TEMPO-attached BTMP shows much improved brightness stability over the original BTMP. Scheme 3 is a schematic representation of permanent attachment of 4-amino-TEMPO to the BTMP in aqueous media using EDC.HCl as a coupling agent/activator and HOBt as an additive.

TABLE 1

PC Number of the BTMP pulps vs. Light Exposure Time

| | PC Number | |
|---|---|---|
| Light exposure time (days) | Original BTMP | 4-Amino-TEMPO-attached BTMP |
| 0 | 0.0 | 0.0 |
| 2 | 0.7 | 0.4 |
| 5 | 1.3 | 0.6 |
| 7 | 1.7 | 0.7 |
| 12.6 | 2.9 | 1.3 |
| 13.6 | 3.1 | 1.5 |
| 15.6 | 3.6 | 1.7 |
| 21.6 | 4.9 | 2.4 |
| 27.6 | 6.2 | 3.1 |
| 29.6 | 6.6 | 3.3 |
| 32.6 | 7.2 | 3.7 |
| 34.6 | 7.7 | 4.0 |
| 36.6 | 8.2 | 4.2 |
| 39.6 | 8.8 | 4.6 |

EXAMPLE 11

A commercial BCTMP (5.0 g od) was reacted with 2.0% (od pulp) of tetrasodium 4,4'-bis[[4-[bis(2-hydroxyethyl)amino]-6-(4-sulphonatoanilino)-1,3,5-triazin-2-yl]amino] stilbene-2,2'-disulphonate] (a commercial fluorescent whitening agent obtained from Ciba Geigy and known as Tinopal ABP-A) and 2.0% (od pulp) of EDC.HCl according to General Procedure A disclosed above except that the Cs of the pulp slurry was 3.0%, the pH of the pulp slurry was adjusted to 5.4±0.1, and the pulp slurry was left at room temperature for 2 h. A separate control reaction was also performed on 5.0 g (od) of the BCTMP according to General Procedure A disclosed above except that no EDC.HCl was used for the reaction and that the Cs of the pulp slurry was 3.0%, the pH of the pulp slurry was adjusted to 5.4±0.1, and the pulp slurry was left at room temperature for 2 h. Handsheets (60 g/m$^2$) of the original BCTMP, the BCTMP treated with Tinopal ABP-A only (without EDC.HCl) and the BCTMP treated with Tinopal ABP-A and EDC.HCl, and ISO brightness values of the handsheets were prepared and determined, respectively, according to General Procedure D disclosed above. The % ISO brightness of the handsheet prepared from the BCTMP treated with Tinopal ABP-A and EDC.HCl is 87.9.

This brightness value is higher than that (81.9) of the handsheet prepared from the original BCTMP or that (84.7) of the handsheet prepared from the BCTMP treated with Tinopal ABP-A only. Scheme 4 is a schematic representation of permanent attachment of a molecule possessing a secondary amino (HRN—) group and an additional functionality to a cellulose material in aqueous media using a water-soluble carbodiimide as a coupling agent/activator. Scheme 5 is a schematic representation of permanent attachment of Tinopal ABP-A to the BCTMP in aqueous media using EDC.HCl as a coupling agent/activator.

EXAMPLE 12

A commercial BCTMP (6.0 g od) was reacted with 1.0% (od pulp) of Tinopal ABP-A and 3.0% (od pulp) of EDC.HCl according to General Procedure A disclosed above except that the Cs of the pulp slurry was 3.0%, the pH of the pulp slurry was adjusted to 5.4±0.1, and the pulp slurry was left at room temperature for 2 h. A separate control reaction was also performed on 6.0 g (od) of the BCTMP according to General Procedure A disclosed above except that no EDC.HCl was used for the reaction and that the Cs of the pulp slurry was 3.0%, the pH of the pulp slurry was adjusted to 5.4±0.1, and the pulp slurry was left at room temperature for 2 h. Handsheets (200 g/m$^2$) of the BCTMP treated with Tinopal ABP-A only (without EDC.HCl) and the BCTMP treated with Tinopal ABP-A and EDC.HCl, and ISO brightness values of the handsheets were prepared and determined, respectively, according to General Procedure D disclosed above. The % ISO brightness of the handsheet prepared from the BCTMP treated with Tinopal ABP-A and EDC.HCl is 88.2. This brightness value is 4.3 ISO brightness points higher than that (83.9) of the handsheet prepared from the BCTMP treated with Tinopal ABP-A only.

EXAMPLE 13

A solution of copper (II) complex of L-ornithine, (S)-(+)-$H_2N(CH_2)_3CH(NH_2)COO^-Cu^{2+}{}_{0.5}$, was prepared from 2.0 g of L-ornithine hydrochloride, (S)-(+)-$H_2N(CH_2)_3CH(NH_2)$COOH.HCl, and 5.0 g of "Cu(II) carbonate, basic", $CuCO_3.Cu(OH)_2$ in 2.0 litres of DI $H_2O$ according to a literature procedure [See reference by Kurtz]. A commercial BCTMP (80.0 g od) was reacted with 1.6 litres of the said solution [1.9% (od pulp)] of the copper (II) complex of L-ornithine and 1.6 g [2.0% (od pulp)] of EDC.HCl according to General Procedure A disclosed above except that the pulp slurry was left at room temperature for 4 h. The pulp was then treated with 2.0% (od pulp) of ethylenediaminotetraacetic (EDTA) at 1.5% Cs, pH 5.0 and 50° C. for 30 min. A separate control reaction was also performed on 80.0 g (od) of the BCTMP according to General Procedure A disclosed above except that no copper (II) complex of L-ornithine or EDC.HCl was used for the reaction and that the pulp slurry was left at room temperature for 4 h. Handsheets (60 g/m$^2$) of the BCTMP treated sequentially with the copper (II) complex of L-ornithine and EDC.HCl at pH 5.0, and with EDTA, and of the BCTMP treated at pH 5.0 were prepared according to the procedure described in PAPTAC Test Methods, Standard C.4. The physical properties of the handsheets were determined according to the procedure described in PAPTAC Test Methods, Standard D.12. The tensile strength of the handsheet prepared from the BCTMP treated sequentially with the copper (II) complex of L-ornithine and EDC.HCl at pH 5.0, and with EDTA is 19.7 (N·m/g). This tensile strength value is higher than that (17.1 N·m/g) of the handsheet prepared from the BCTMP treated at pH 5.0. Scheme 6 is a schematic representation of permanent attachment of the copper (II) complex of L-ornithine to the BCTMP in aqueous media using EDC.HCl as a coupling agent/activator and the subsequent generation of the free α-amino-acid functionality in the pulp.

EXAMPLE 14

A sample of a commercial northern bleached hardwood kraft (NBHK) pulp with a Canadian Standard Freeness (CSF) of 591 mL was refined (also referred to as beaten) to a CSF of 259 mL by means of the PFI Mill at 10500 revolutions according to the procedure described in PAPTAC Test Methods, Standard C.7. The total and the surface carboxyl (COOH) group contents of the unrefined NBHK (CSF=591 mL) were determined to be 51.0 and 7.6 mmol/kg, respectively, according to the conductometric titration procedure [See reference by Katz et al.] and the polyelectrolyte titration procedure [See references by Horvath and Lindstrom, by Winter et al., and by Terayama]. The total and the surface carboxyl (COOH) group contents of the refined NBHK (CSF=259 mL) were determined to be 51.0 and 10.0 mmol/kg, respectively, according to the conductometric titration procedure [See reference by Katz et al.] and the polyelectrolyte titration procedure [See references by Horvath and Lindstrom, by Winter et al., and by Terayama]. A sample of the unrefined NBHK (CSF=591 mL, surface carboxyl group content=7.6 mmol/kg) (5.0 g od) was reacted with 0.49% (od pulp) of 5-aminofluorescein ("A-fluo") and 0.50% (od pulp) of EDC.HCl according to the General Procedure A disclosed above except that the pH of the pulp slurry was adjusted to 4.0±0.1, and the pulp slurry was left at room temperature for 2 h. A sample of the refined NBHK (CSF=259 mL, surface carboxyl group content=10.0 mmol/kg) (5.0 g od) was also reacted with 0.49% (od pulp) of 5-aminofluorescein ("A-fluo") and 0.50% (od pulp) of EDC.HCl according to the General Procedure A disclosed above except that the pH of the pulp slurry was adjusted to 4.0±0.1, and the pulp slurry was left at room temperature for 2 h. The amounts of "A-fluo" attached to the unrefined NBHK and to the refined NBHK were determined to be 0.13% and 0.16% (od pulp), respectively, according to General Procedure B disclosed above. An increase of the surface carboxyl group content of the NBHK by refining increases the reactivity of the pulp towards A-fluo as shown by a higher amount of A-fluo attached to the pulp.

References Cited

Other Publications

Allan et al., "Fiber Surface Modification. Part I The Reactivity of Lignocellulosic Fibers with a Dichloro-s-Triazine", Paperi ja Puu 50(9): 529-534 (1968).

Dong and Roman, "Fluorescently labeled cellulose nanocrystals for bioimaging applications", J. Am. Chem. Soc. 129: 13810-13811 (2007).

Lonngren and Goldstein, "Coupling of Aldobionic Acids to Proteins Using Water-soluble Carbodiimide" in: Methods in Enzymology, Academic Press, Inc. Vol. 242, pp. 116-123 (1994).

Nakajima and Ikada, "Mechanism of Amide Formation by Carbodiimide for Bioconjugation in Aqueous Media", Bioconjugate Chem. 6: 123-130 (1995).

Sehgal and Vijay, "A Method for the High Efficiency of Water-soluble Carbodiimide-mediated Amidation", Anal. Biochem. 218: 87-91 (1994).

Nozaki, "Efficient Amounts of Additives for Peptide Coupling Mediated by a Water-soluble Carbodiimide in Aqueous Media", Chem. Lett. 1-2 (1997).

Kitaoka et al., "Sizing Mechanism of Emulsion Rosin Size-Alum Systems Part 1. Relationships between Sizing Degrees and Rosin Size or Aluminium Content in Rosin-sized Handsheets", *Nordic Pulp Paper Res. J.* 4: 253-260 (1995).

Saari and Seitz, "pH Sensor based on immobilized fluoresceinamine (isomer I)", *Anal. Chem.* 54: 821-823 (1982).

Ham et al., "Application of optical fiber pH sensor: sensors based on chemical bond of the dye with the surface of materials", Polymer Preprints 45(1): 978-979 (2004).

Kang et al., "Applications of pH sensor using a covalent bond indicator based on containing functional group copolymer", *Mol. Cryst. Liq. Cryst.* 445: 285/[575]-29/[580], (2006).

Kurtz, "Use of copper (II) ion in masking α-amino groups of amino acids", *J. Biol. Chem.* 180(3): 1253-1267 (1949).

Katz et al., "The determination of strong and weak acidic groups in sulfite pulps", *Svensk Papperstidn.* 87(6): R48-R53 (1984).

Horvath and Lindstrom, "Indirect polyelectrolyte titration of cellulosic fibers—surface and bulk charges of cellulosic fibers", *Nordic Pulp Paper Res. J.* 22(1): 87-92 (2007).

Winter et al., "Polyelectrolytes adsorbed on the surface of cellulosic materials", *J. Colloid Interface Sci.* 111(2): 537-543 (1986).

Terayama, "Method of colloid titration (a new titration between polymer ions", *J. Polym. Sci.* 8(2): 243-253 (1952).

The invention claimed is:

1. A modified cellulosic, lignocellulosic or cellulose material comprising: a cellulosic, lignocellulosic or cellulose substrate bearing an amino modifier, said modifier being covalently linked through the amino of said modifier to a carboxyl of said substrate, said modifier possessing a single primary or secondary amino group and having a functionality capable of introducing a foreign or an improved property into said substrate, said substrate being a non-chemically derivatised substrate selected from the group consisting of papermaking pulp, microfibrillated cellulose and nanofibrillated cellulose.

2. A modified cellulosic, lignocellulosic or cellulose material according to claim 1, wherein said substrate is a papermaking pulp.

3. A modified cellulosic, lignocellulosic or cellulose material according to claim 2, wherein the modifier is an amino-aryl fluorescent or FTIR- or Raman-detectable molecule or an amino-yellowing inhibitor molecule.

4. A modified cellulosic, lignocellulosic or cellulose material according to claim 1, wherein said modifier is a primary or secondary, amino-aryl fluorescent compound.

5. A modified cellulosic, lignocellulosic or cellulose material according to claim 4, wherein said amino-aryl fluorescent compound is 5-aminofluorescein or 4-aminofluorescein, said modifier providing an authenticating property in said substrate.

6. A modified cellulosic, lignocellulosic or cellulose material according to claim 1, wherein said substrate is a bleached papermaking pulp.

7. A modified cellulosic, lignocellulosic or cellulose material according to claim 6, wherein said modifier is 4-amino-2,2,6,6-tetramethylpiperidine-N-oxyl, said modifier providing a yellowing inhibition property in said substrate.

8. A modified cellulosic, lignocellulosic or cellulose material according to claim 1, where the said modifier is represented by the formula (I):

$$\text{YHN-AX} \tag{I}$$

wherein YHN— is a primary or secondary amino, wherein Y is hydrogen (H) in a primary amino; and -AX is a functional radical, or -X is a functional radical and —A- is an inert support or frame for the primary amino YHN- and the functional radical X, said functional radical providing said functionality.

9. A modified cellulosic, lignocellulosic or cellulose material according to claim 8, wherein Y is an alkyl of 1 to 6 or an aryl of $C_6H_5$ or $C_6H_{5-n}R_n$ where R is a carboxyl (COOH), carboxylate ($COO^-$), sulfonic ($SO_3H$) or sulfonate ($SO_3^-$) group and n is 1 or 2 in a secondary amino; and -AX is a functional radical, or -X is a functional radical and —A- is an inert support or frame for the secondary amino YHN- and the functional radical X; when R is a carboxylate ($COO^-$) or sulfonate ($SO_3^-$), a counter cation is also present.

10. A modified cellulosic, lignocellulosic or cellulose material according to claim 1, represented by the formula (II):

$$\text{Sub-C(O)—NY-AX} \tag{II}$$

wherein:

Sub is said substrate of cellulosic, lignocellulosic or cellulose material;

Y is H, alkyl of 1 to 6 or an aryl of $C_6H_5$ or $C_6H_{5-n}R_n$ where R is a carboxyl (COOH), carboxylate ($COO^-$), sulfonic ($SO_3H$) or sulfonate ($SO_3^-$) group and n is 1 or 2; and -AX is a functional radical, or -X is a functional radical and —A- is an inert support or frame for —CO-NY- and the functional radical X; and when R is a carboxylate ($COO^-$) or sulfonate ($SO_3^-$), a counter cation is also present.

11. A modified cellulosic, lignocellulosic or cellulose material according to claim 1, wherein the modifier is an amino-aryl fluorescent or FTIR- or Raman-detectable molecule or an amino-yellowing inhibitor molecule.

12. A paper comprising a modified papermaking pulp as recited in claim 2.

13. A paper according to claim 12, wherein the pulp is modified with an amino-aryl fluorescent or FTIR- or Raman-detectable molecule or an amino-yellowing inhibitor molecule.

14. A paper comprising a modified papermaking pulp as recited in claim 6.

15. A process of producing a modified cellulosic, lignocellulosic or cellulose material comprising covalently linking through an amido (C(O)—NH or C(O)—NR) group, a primary or secondary amino modifier, through the amino of said modifier posssessing a single primary or secondary amino group and, to a carboxyl of a cellulosic, lignocellulosic or cellulose substrate, in an aqueous medium in the presence of a water-soluble carbodiimide coupling agent/activator, said modifier having a functionality capable of introducing a foreign or an improved property into said substrate, said substrate being a non-chemically derivatised substrate selected from the group consisting of papermaking pulp, microfibrillated cellulose and nanofibrillated cellulose.

16. A process according to claim 15, wherein said carbodiimide coupling agent/activator is 1-ethyl-3-(3-(dimethylamino)propyl)carbodiimide hydrochloride (EDC•HCl).

17. A process according to claim 15, wherein said carbodiimide coupling agent/activator is N-cyclohexyl-N'-(2-morpholinoethyl)carbod iimide methyl-p-toluenesulfonate.

* * * * *